2,710,901

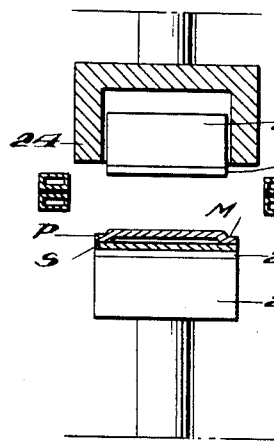
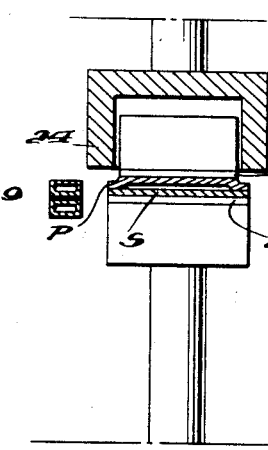
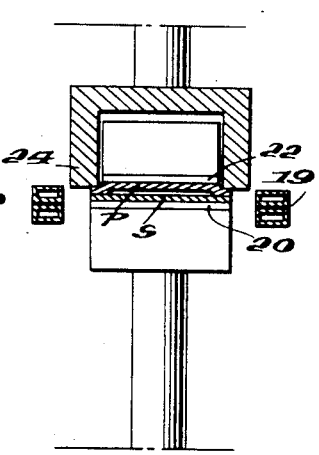
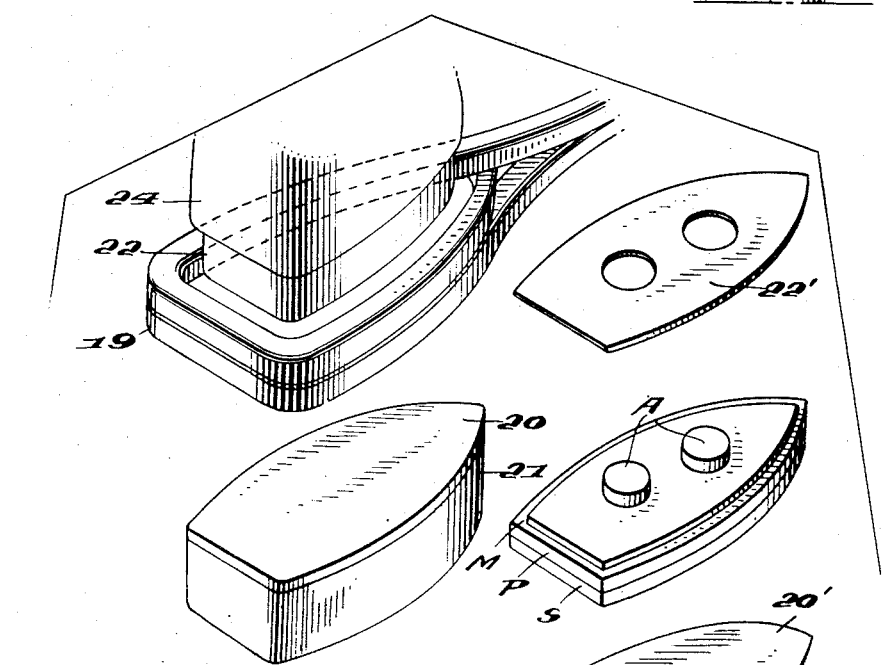

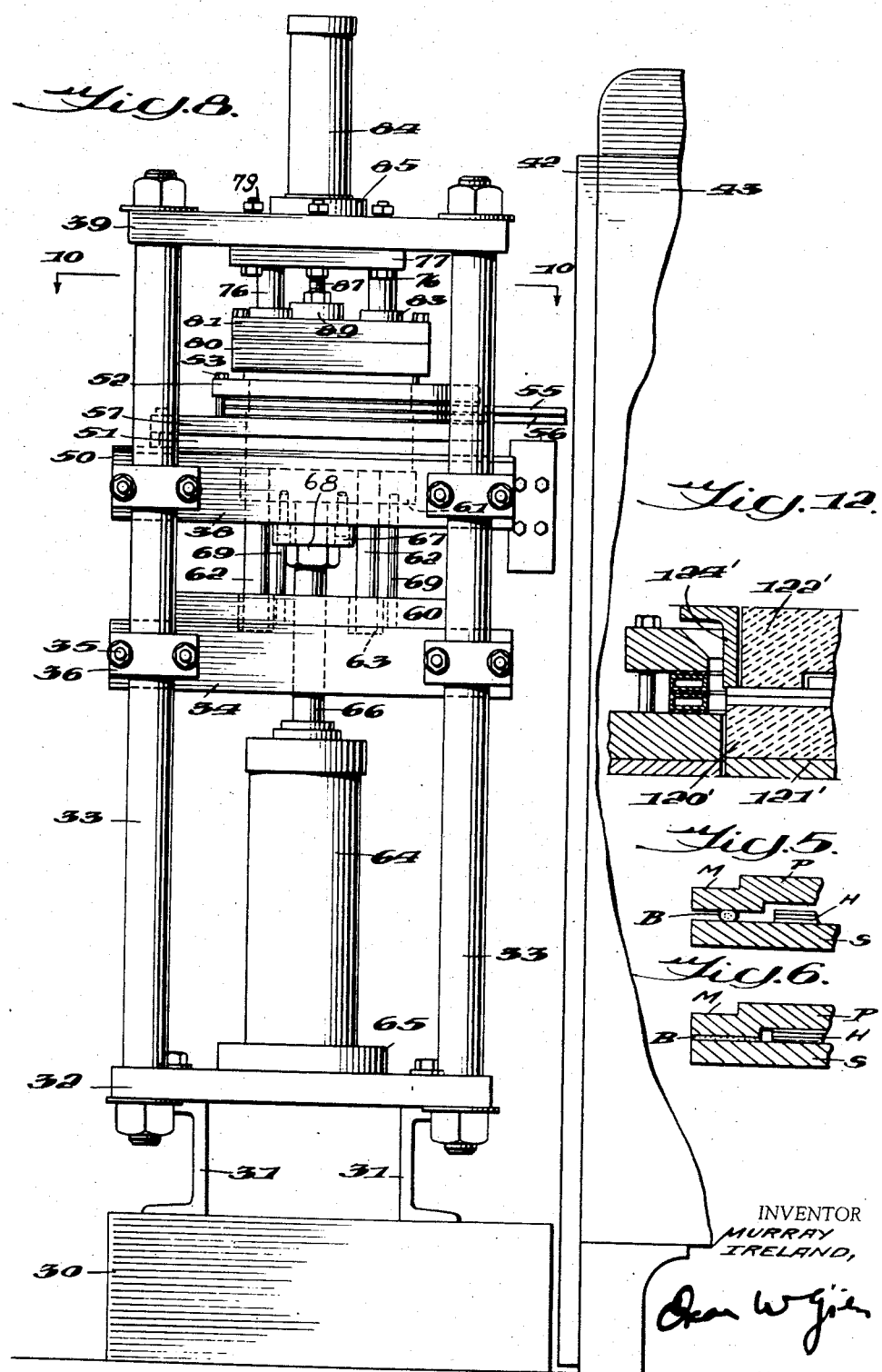

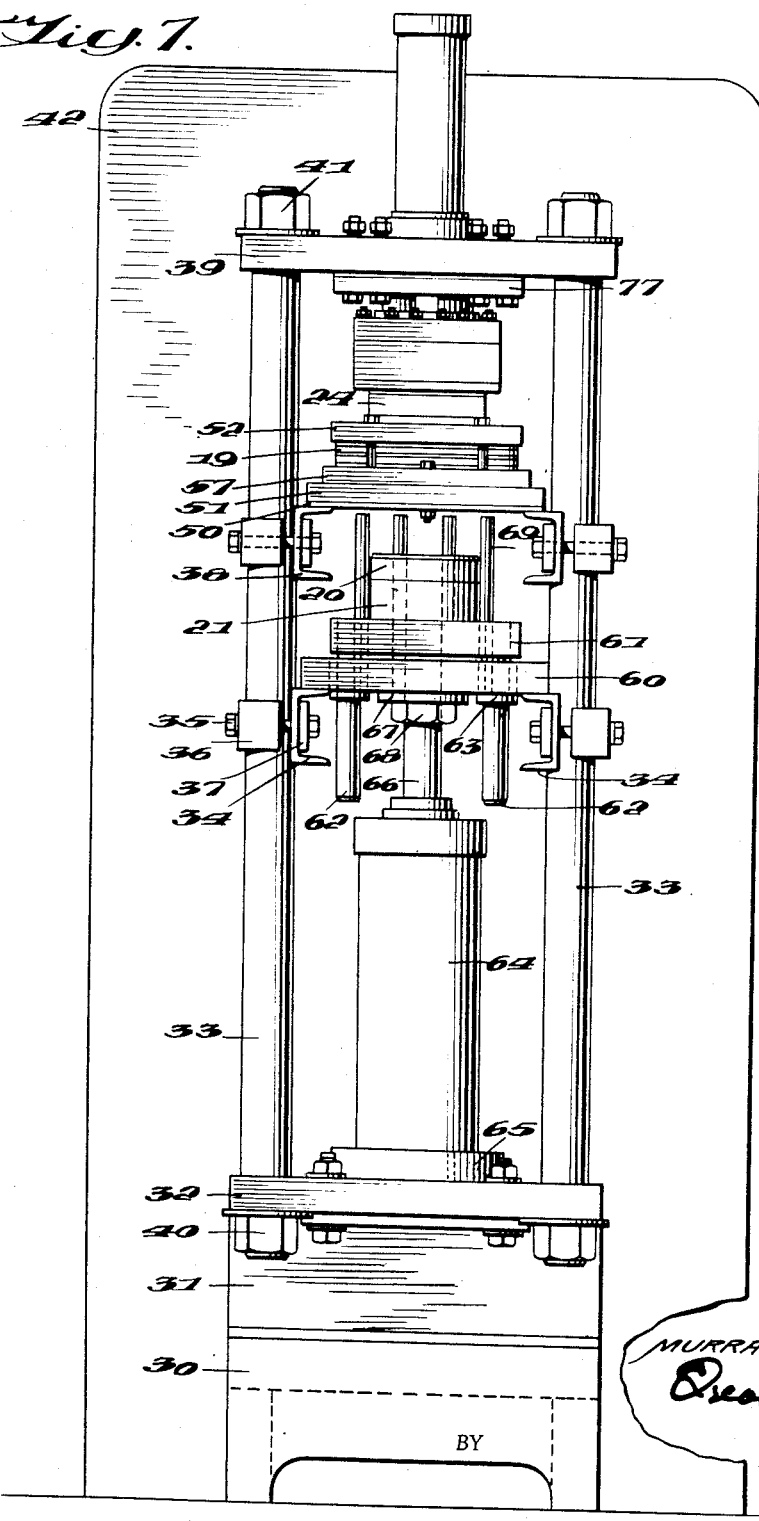

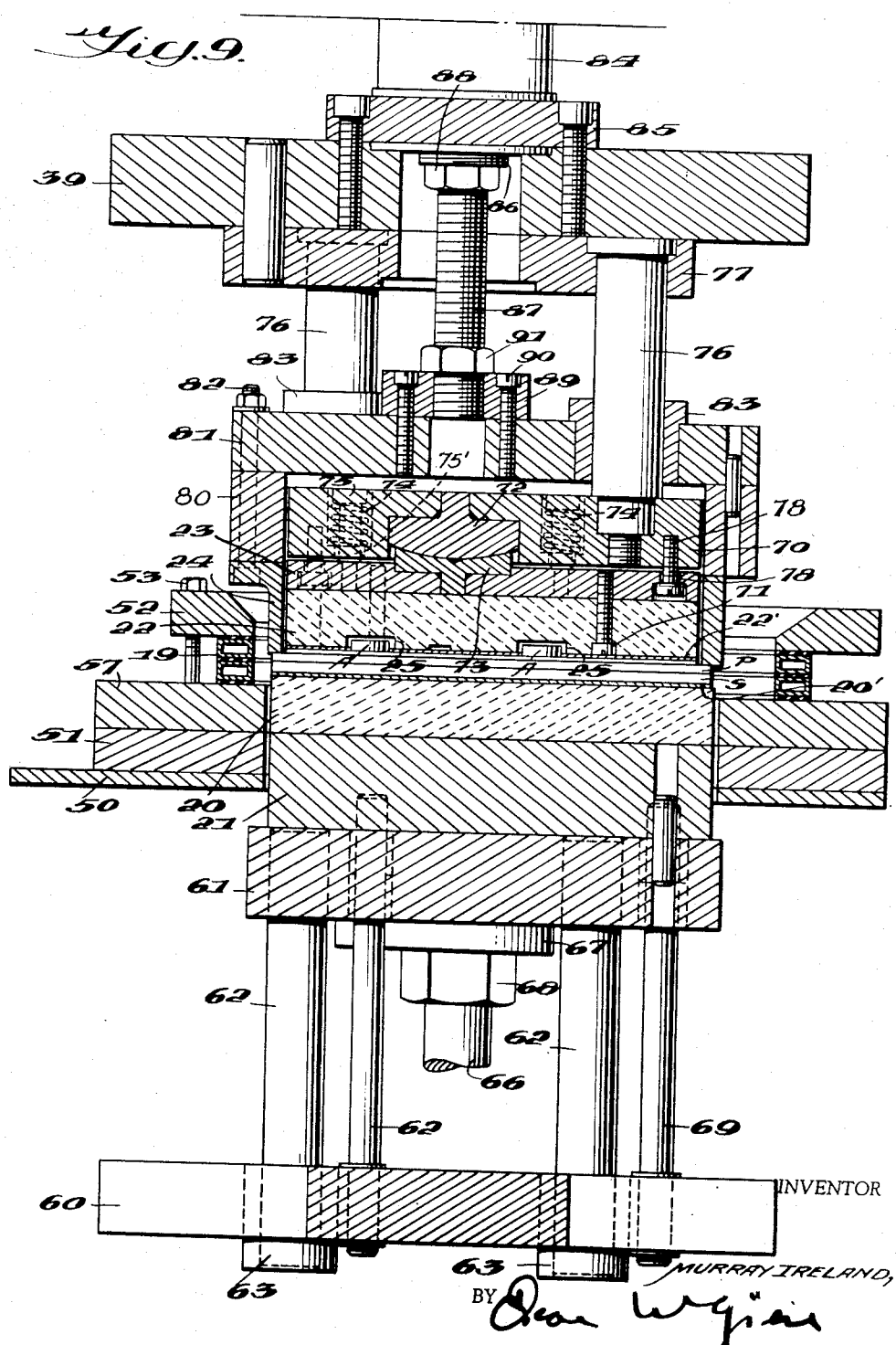

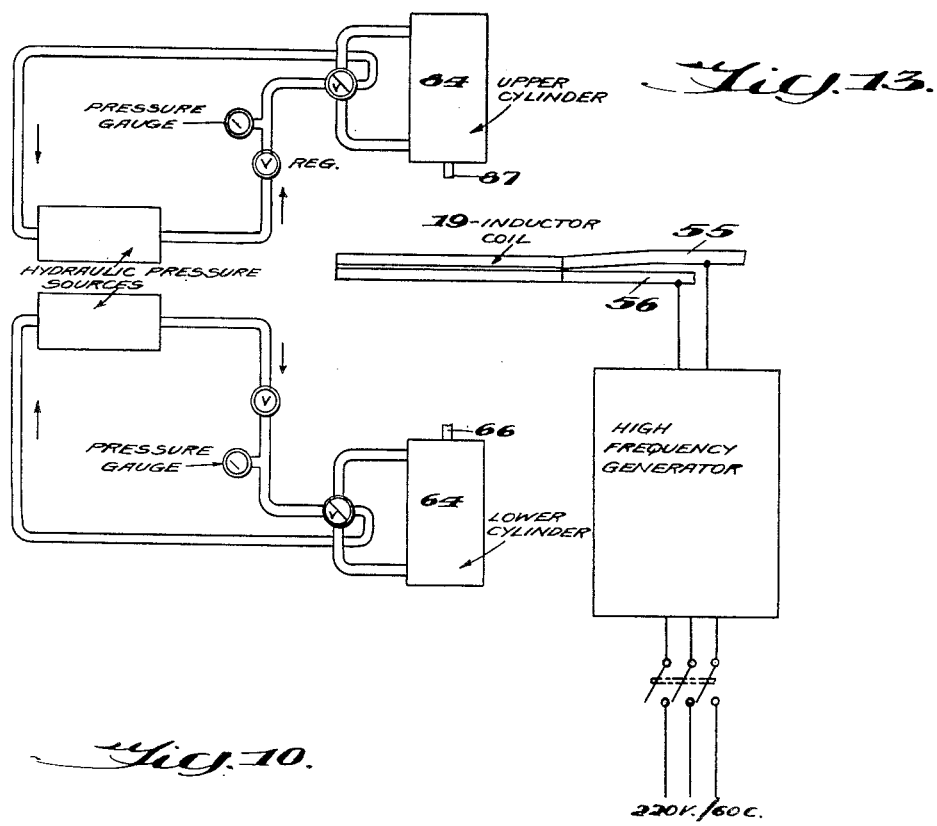
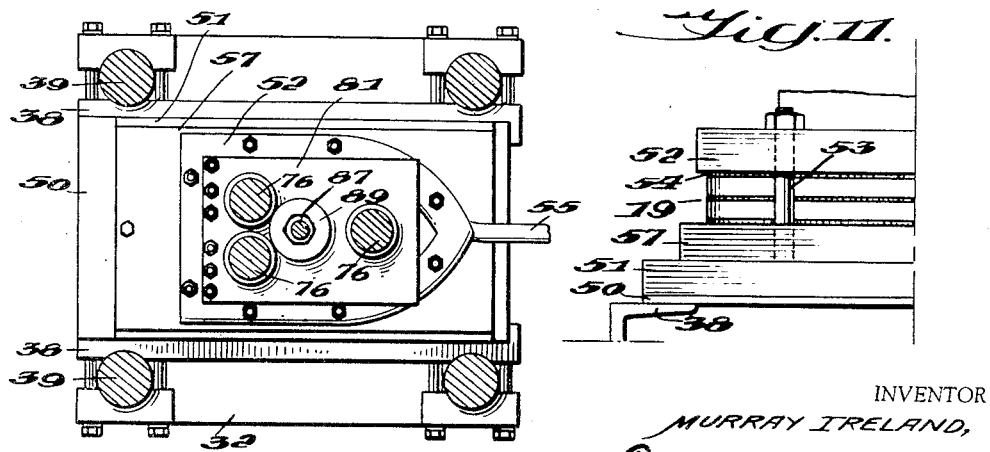

METHOD AND MACHINE FOR BRAZING ELECTRIC IRON BODY ASSEMBLIES

Murray Ireland, Elgin, Ill., assignor to McGraw Electric Company, Elgin, Ill., a corporation of Delaware Application September 25, 1950, Serial No. 186,594

28 Claims. (Cl. 219—10)

This invention is directed to the brazing of electric sadiron body assemblies and involves a novel improved method and a novel machine for such purpose.

The general object of the invention is to secure the parts of an electric sadiron assembly in a compressed condition with a brazed bond. Such parts include the sole plate pressure or top plate and a flat electric heating element between the plates which must be in intimate heat exchange with the sole plate for the proper heating thereof.

Another object of the invention is to provide improvements in the brazing of electric sadiron body assemblies under compression.

Another object of the invention is to provide for the brazing of electric sadiron body assemblies under high frequency heating.

Another object of the invention is to provide a novel combined high frequency heating and pressure technique adapted to the brazing of electric sadiron body assemblies.

Another object of the invention is to provide an improved method of brazing electric sadiron body assemblies in which different pressures are applied to different areas of the assemblies.

Another object of the invention is to provide an improved method of assembling electric sadiron bodies.

Another object is the provision of an improved method of assembling and brazing sadiron bodies to insure tight clamping of the heating elements regardless of variations in thickness thereof.

Another object is to provide a method of assembling sadiron bodies wherein the heating-element-clamping portion and the raised portion are separately formed and pressed into place.

Another object of the invention is to braze electric sadiron body assemblies under high pressures, and, further, to accomplish this without injury to surfaces of the assemblies.

In the prior copending application for patent of Murray Ireland and John R. Gomersall, Serial No. 586,099, filed April 2, 1945, now Patent 2,585,928, dated February 19, 1952, there is disclosed and claimed a method of securing electric sadiron assemblies of sole plate, flat electric heating element and pressure plate by applying silver alloy wire brazing material between the margins of the plates of such an assembly, heating the assembly on or in a heating means to a temperature of the order of 1300° F. or at least high enough to melt the brazing material, and applying an increased pressure of the order of 1000 lbs. per sq. in. as uniformly as possible to the assembly when it has reached the desired temperature to tightly clamp the assembly so that with melting of the brazing material the heating element will be clamped tightly and sealed between the plates. The assembly is then cooled while still under pressure to 600° to 800° F. to give the braze an opportunity to set, following which the pressure is relieved.

The stated prior method is generally satisfactory particularly as applied to brass sole and pressure plates because the metal of the pressure or top plate softens under the high temperature and gives under the high temperature until stopped by the tightly compressed heating element. However, the heating elements themselves vary considerably in thickness and the prior method required that the preformed cavity in the plate have a depth approximately the thickness of the heating element, else the element might not be clamped tight.

The present application involves improvements on the method of the above identified prior Patent 2,585,928, designed to give even better and more uniform results and, further, provides a novel machine for the efficient production of the sadiron assemblies according to the improved method.

According to the present invention the sole plate and top plate are assembled with a flat electric heating element between them in a recess in one of the plates, preferably in the pressure plate, and with brazing material of silver alloy solder, ordinarily in wire form, between the margins of the plates around their entire peripheries. The recess is slightly shallower than the thickness of the heating element to insure that the central portions of the plate may be pressed into tight engagement therewith. The main areas of the plates inwardly of the margins are then clamped under pressure and the margins are subjected to heating sufficient to melt the brazing material. In this manner the plates are tightly compressed against the heating element. As an additional step, local pressure is independently applied to the margins of the plates to press them together and to press the brazing material into a thin film between the margins. Under operating temperature and pressure the margins undergo some softening to eliminate the effects of any irregularities between their opposing faces and they are brought into intimate relation with only the thin film of brazing material between them. Since the pressure on the margins of the plates cannot be effective until the brazing material has melted, the application of such pressure will preferably be deferred until heating has progressed sufficiently high to melt the brazing material. However, the pressure at the margins can be applied earlier, even though not effective until the brazing material melts.

The heating of the plates must be sufficient to melt the brazing material. High frequency inductional heating is preferred as particularly well suited to the purpose, but ovens or other heating means may be employed. The melting temperatures of various silver alloy brazing solders vary somewhat but usually lie in the range of 1100° to 1200° F. Heating of the plates of the assembly will ordinarily lie within this range, although a higher temperature may be employed. If, for example, a silver alloy solder is employed having a melting temperature of 1125° F. a heating temperature of around 1150° F. will be satisfactory. The pressure applied to the margins of the plates should be sufficient under the heating temperature to cause the margins to compress the brazing material into a thin bonding film, and, moreover, to produce some softening and forming of the margins as previously explained. But the pressure should not be so great as to cause lateral distortion and extrusion of the margins. The pressure to be employed to satisfy these conditions may vary over a considerable range depending upon the kind of metal of which the plates are composed and the heating temperature, and does not appear to be critical for plates of a particular metal with their margins heated to a particular temperature, and higher temperatures in the margins will permit lower applied pressures. An applied pressure at the margins of about 700 lbs. per sq. in. may be found adequate or, again, a pressure of 1200 lbs. per sq. in. or higher may be found desirable, depending upon these variables. For sole plates and pressure plates of high yellow brass I have found that a pressure of 900 lbs. is satisfactory but subject to variations for heating temperatures within the above-mentioned range. For other metals such as steel or its alloys a considerably higher pressure may be found desirable. The clamping pressure applied to the main area of the plates for compressing them into tight contact with the heating element can be substantially more or less than the pressure applied to the margins of the plates. Under some conditions a pressure of about 500 lbs. per sq. in. may be found suitable while under other conditions the pressure may be carried up within the range of 3000 lbs. to 4000 lbs. per sq. in. without adverse results. I have found that a pressure of 600 lbs. per sq. in. produces a satisfactory clamping of the parts in intimate relation under average conditions.

The separate application of pressure to the main and marginal areas of the plate assemblies may be from the same or opposite sides. As a precaution against possible injury to the smoothness of the bottom ironing face of the sole plate by a pressure member operating in the marginal area it is desirable that the pressure applying means for both the marginal and main areas act against the pressure plate and that the entire bottom of the sole plate be supported by a continuous surface. However, the clamping pressure for the main area may be transmitted through the bottom plate by making such member movable. Again, such member may be stationary and the clamping pressure applied to the top plate through a movable upper pressure member capable of movement independently of the pressure member acting upon the margins of the plate assembly.

It has been found that under the high temperatures employed the plate assembly undergoes expansion and relative movement to the coacting surfaces of the pressure applying members because of differences in the amount of expansion of the latter. It is therefore desirable that the surfaces of the pressure applying members be smooth to permit slippage between the surfaces of the plates and the pressure applying members under the high pressures involved. Metal pressure applying members are not desirable because they tend to be heated by the heater and further present the hazard of becoming bonded to the metal soleplate by brazing material that spills. Heat resistant non-metallic pressure plates are recommended. Many such materials present a somewhat rough surface. I have found, however, that natural mica presents an excellent smooth face for contact with the surfaces of the plate assembly and stands up under the heat to which it is exposed and, accordingly, I prefer to make the opposing pressure appling members in whole or in part of such material, which has strength as well as smoothness.

The invention will be more fully understood by reference to the accompanying drawings and the description thereof to follow.

In the drawings—

Fig. 1 is a diagrammatic view showing the starting stage of the brazing of an electric iron body assembly by the new inventive method;

Fig. 2 is a similar view showing the second stage;

Fig. 3 is a similar view showing the third stage;

Fig. 4 is an exploded perspective view of the parts shown in Figs. 1 to 3;

Fig. 5 is an enlarged fragmentary vertical sectional view of the electric iron body assembly preparatory to brazing;

Fig. 6 is a view similar to Fig. 5 showing the electric iron body assembly after completion of brazing;

Fig. 7 is a front elevational view of a high frequency brazing machine embodying the invention, the same being adapted to perform according to the method illustrated in Figs. 1 to 3, the same being shown with the operating parts as in Fig. 1 but the electric iron body assembly being omitted;

Fig. 8 is an elevational view of the right side of the machine, with the operating parts in the same positions as in Fig. 3;

Fig. 9 is an enlarged fragmentary vertical side sectional view of the machine, showing the details with the operating parts in the positions shown in Fig. 8;

Fig. 10 is a view, looking down, taken on line 10—10 of Fig. 8;

Fig. 11 is an enlarged fragmentary front elevational view of a portion of the heating coil and associated parts as shown in Fig. 7;

Fig. 12 is a fragmentary vertical sectional view of a portion of the heating coil and associated parts, similar to Fig. 8 but showing a modified construction of some of the parts; and Fig. 13 is a diagrammatic view of a simple operating circuit for the machine.

Referring first to Figs. 4, 5 and 6, I have shown therein an electric sadiron body assembly comprising a sole plate S, and a pressure or top plate P having a recess between them, here formed in the pressure plate, inwardly of the margin M for a flat electric heating element H (Fig. 5). Such element is to be tightly and permanently clamped and sealed between the two plates (Fig. 6) and this is here accomplished by brazing together the opposing margins of the plates with a brazing material B under the high temperature and pressure condition already stated. Parts A (Fig. 4) are metal plugs upstanding from plate P which may be employed to secure other sadiron parts to the present assembly. For present purposes it may be assumed that such plugs are already brazed at their lower ends (not shown) to the sole plate S and that they extend upward through fitting openings in pressure plate P so as to hold the two plates with their peripheries in registry for the brazing of the assembly now to be described.

The brazing material B will have been introduced in wire form between the margins of the plates as a preliminary matter, incident to the initial assembly of plates S and P and heating element H. The starting condition of the parts for present purposes will be as shown in Fig. 5, and as further generally shown in Fig. 4. The finished brazed assembly is as shown in Fig. 6. Because of their small size heating element H and brazing material B have not been shown in the drawings except in large scale, Figs. 5 and 6, but their presence at all times is to be assumed. For purposes of identification the complete assembly will be referred to in conjunction with plates S and P.

The new brazing method is illustrated in Figs. 1, 2 and 3, employing preferred inductional heating. The sadiron assembly S—P is shown in Fig. 1 ready for introduction into an inductor heating coil 19 of a high frequency heating apparatus. Such coil is preferably shaped to sadiron contour as shown in Fig. 4. A lower pressure member is provided upon which the assembly is installed for upward movement into the heating zone of the coil. Such lower pressure member is shown as having a top section 20, and a bottom section 21. An upper pressure member is provided which may be permanently mounted upwardly adjacent coil 19. Such member is likewise shown as comprising two sections 22 and 23. It will be observed that the upper pressure member is of smaller surface area than the lower pressure member so as to make pressure contact with plate P of the assembly inwardly of the margin M. A third pressure member 24 is provided to coact with the lower pressure member in applying local pressure to margin M of the assembly.

In the next stage shown in Fig. 2 assembly S—P is clamped under pressure between the stationary upper pressure member and the movable lower pressure member in the heating zone of coil 19. The clamping pressure exerted should, as previously explained, be such as to clamp the two plates S and P tightly against the heating element H (not shown). Heating coil 19 is energized to heat the assembly up to the melting temperature of the brazing material.

In the further stage, shown in Fig. 3, upper pressure member 24 is moved downwardly to apply local pressure to the margins of the assembly at or about the time that the brazing material has melted. The pressure applied through pressure member 24 is preferably around 900 lbs. per sq. in. Through the coaction of the lower pressure member the margins of the assembly are compressed tightly together to spread the bonding material out into a thin film between them. Also, as earlier explained, the margins, mainly the margin of plate P will soften somewhat under the high temperature and pressure to eliminate any unevennesses existing in the opposing surfaces of the margins.

The marginal operation just described is substantially instantaneous. As soon as it has been effected heating coil 19 is rendered inoperative, or, alternatively, this may be done as early as just prior to the application of pressure to the margins. The pressure is applied to the main and marginal areas of the assembly and continued during cooling down at least to the hardening temperature of the bonding material, in the range of 600° to 800° F. Thereafter the now bonded assembly S—P is relieved of pressure by lowering of the lower pressure member and withdrawn for further cooling. Thereafter, it will be desirable to machine the peripheral surfaces of the margins of the bonded assembly to remove any excess brazing material which may have been forced out at the periphery.

The lower and upper pressure members 20, 21 and 22, 23 are movable one relative to the other to provide clamping engagement of the main area of the iron assembly in the heating zone of the heating coil. It will be understood that either of such members may be made stationary and the other movable. It is preferred that the lower pressure member be made movable as has been illustrated and described so that the same may be employed as an elevator for moving the assembly to and from the heating zone.

The machine for brazing the sadiron body assemblies S—P is shown in Figs. 7 to 11 and 13. The same is designed to operate in accordance with the method which has just been described. A heating inductor coil 19 comprising two turns of copper tubing and being in the shape of a sadiron so as to uniformly heat the assembly S—P is connected by suitable conductors with a high frequency current generator (Fig. 13). Such generator is connected with a three phase alternating current source and adapted to deliver high frequency current to the coil at 10,000 cycles per sec., or thereabouts. Coil 19 also is connected with a water source (not shown) for circulating water as a coolant through the coil. A lower pressure member is mounted in the machine and, as best shown in Figs. 9 and 7 comprises a pressure plate 20 conforming to the shape of the sadiron assemblies S—P. Plate 20 is of a refractory material, preferably of Portland cement and asbestos composition commercially sold under the name Transite but it also may be made of lava. Underlying plate 20 is a second element of the pressure member comprising a similarly shaped relatively thick metal plate 21. The composition of plate 20 is intended to withstand the high operating temperatures in the range of 1100° to 1200° F. developed by the heating coil and to limit the conduction of heat to plate 21 and the other parts of the machine. Because of its composition pressure plate 20 is weakened by heat to such an extent that expansion of the brass soleplate when heated pulls it apart. The high coefficient of friction between the brass plate and the plate 20, coupled with the high pressure with which these surfaces are held together, causes the expanding brass plate to exert very large tangential forces on the plate 20, tending to pull it apart. Accordingly, the lower pressure member includes as an additional element a mica top face plate 20' having a smooth surface and heat resistant properties already mentioned and of the sadiron shape of the assembly, as shown in Fig. 4, and designed for removal from the top of plate 20.

An upper pressure member comprises a pressure plate 22 of sadiron shape and of the same refractory composition as plate 20. Backing plate 22 is a similarly shaped metal backing plate 23. Pressure plate 22, because of its composition, is faced by a removable thin pressure plate 22' of mica for reasons already explained, best shown in Fig. 4. Plate 22' is provided with apertures to receive posts A of the sadiron assemblies S—P and recesses 25 are provided in the lower portion of plate 22 to accommodate such posts (Fig. 9). Surrounding the upper pressure member comprising plates 22 and 23 is a second independent pressure member 24 of hollow sadiron shape and having a relatively thin wall designed at its lower end to coact with the margin M of pressure plate P of the sadiron assemblies.

The heating and pressure members of the machine just described are supported in a frame comprising a base 30 (Figs. 7 and 8) having thereon a pair of channeled cross frame members 31 securing a heavy bottom plate 32. Mounted on plate 32 are strong upright rods 33 and a pair of channeled cross frame members 34 are secured, respectively, to the front and back upright rods 33 by securing bolts 35 and outer and inner clamping elements 36 and 37. Spaced upwardly of members 34 are similar channeled cross frame members 38 secured to the upright rods in the same manner. At the upper end of rods 33 is a top plate 39. The lower and upper ends of rods 33 are of reduced diameter to provide shoulders (not shown) seating against bottom and top plates 32 and 39 and nuts 40 and 41 secure the ends of the rods to the plates. Reference numerals 42 and 43 indicate the housing of high frequency equipment associated with the machine for energizing the heating coils 55 and 56.

Supported by upper cross frame members 38 is a mounting plate 50 on which are supported a heavy metal plate 51 and an insulating plate 57. As shown in Fig. 9, such plates are provided with an opening shaped to conform to the sadiron shape of the lower pressure member. Heating coil 19 is mounted horizontally on top of plate 57 by means of an insulating clamping frame 52 by means of clamping bolts 53. Such clamping frame generally conforms to the shape of the heating coil as shown in Fig. 10. As shown in Fig. 11 the turns of the heating coil may be separated from each other and from frame 52 and plate 57 by insulating elements 54 of mica. Outlet tubes 55 and 56 integral with the copper tubes of the coil extend rearwardly out of the machine as shown in Figs. 9 and 10 and are connected to the high frequency generator and to a coolant supply and discharge as previously described.

The lower pressure assembly is mounted by plate 60 secured on cross frame members 34 (Figs. 7 and 8). A riser block 61 is supported by plate 60 for vertical movement. A series of four guide rods 62 secured to the riser block project downwardly therefrom and are slidably mounted in bushings 63 secured in plate 60. Riser block 61 is suitably secured to plate 21 of the lower pressure member. When riser block 61 is in its lower position resting on plate 60 (Fig. 7), the lower pressure member is spaced below the heating coil and its mounting plates 51 and 57 so that the sadiron assemblies S—P may be placed thereon at the start of a brazing operation.

A reciprocating hydraulic motor 64 is secured through its base portion 65 to bottom plate 32 of the frame. Piston rod 66 of the motor is secured at its upper end to push block 67 to hold it to the underside of the riser block 61. The end of rod 66 is preferably threaded into block 67 and nut 68 on the rod projects for adjustment so that the lower pressure member when in its upper position may be correctly disposed relative to the upper pressure member. When riser block 61 and the lower pressure member are in their lower position, block 67 projects downwardly through an opening in place 60 (Fig. 7).

In order that the sadiron assemblies S—P may be correctly positioned on the lower pressure member a series of four article seating rods 69 are provided. These are arranged to be located in immediate proximity to the periphery of plates 20 and 21 of the lower pressure member when the riser block 61 is in its lower position. Such seating rods are stationary, being threaded at their lower ends into plate 60 and being received in apertures in the riser block 61.

The upper pressure member of the machine is supported in fixed position upwardly adjacent heating coil 19 by means of a stop plate 70. A series of screws 71 secure pressure plates 22 and 23. To provide for slight adjusting movement of pressure plates 22 and 23 to conform to the plane of the upper plate P of the sadiron assemblies, such plates are mounted for slight movement relative to stop plate 70 by means of a series of screws 78 which have a loose connection with plate 23 (Fig. 9). Mounted in a recess in stop plate 70 is an equalizer member 72 having a convex lower face in sliding engagement with the upper concave face of a seating member 73 secured to upper pressure plate 23. A series of coil deflection springs 74 are secured in recesses in plate 70 on bolts 75. The lower end 75' of the bolts is threaded in plate 23 so that the lower pressure member is tensioned upwardly to provide seating engagement between the equalizer 72 and its seating member 73. It will be apparent that the lower pressure member may tilt relative to stop plate 70 in view of this arrangement.

Stop plate 70 is supported by a series of three vertical posts 76 having headed upper ends secured by a retaining ring 77 to frame top plate 39 by a series of bolts 79 (Fig. 8).

The second hollow upper pressure member 24 for engagement with the margins of the sadiron assemblies S—P is mounted for vertical movement relative to heating coil 19 and the first upper pressure member 22, 23, and with the minimum working clearance (Fig. 9) necessary between the two pressure members to allow for expansion of parts under the high temperature generated by the heating coil. Extending upwardly from pressure member 24 is a hollow rectangular extension member 80 surrounding stop plate 70, which likewise is rectangular. The overall height of members 24 and 80 is somewhat greater than the combined height of the first upper pressure member 22, 23 and stop plate 70. A top plate 81 supports members 24 and 80 by bolts 82 and forms with such members a cup-like hollow structure which entirely encases the first upper pressure member and stop plate 70 when in operative position. Top plate 81 is provided with three openings in which are secured bushings 83 slidable on posts 76, as guides, so that the entire cup-like structure is vertically movable but adapted to be alined with the margins of the sadiron assemblies S—P.

A second reciprocating hydraulic motor 84 is mounted by a base plate 85 on top plate 39 of the frame. The movable head 86 of the motor projects downwardly through a central opening (Fig. 9) in plate 39 and is threaded on the upper end of rod 87. A retaining nut 88 on the rod engages the underside of head 86. A retaining ring 89 is secured by bolts 90 to top plate 81 and is threaded on the lower end of rod 87. Upon the rod is a retaining nut 91 engageable with the ring. The whole cup-like structure including plate 81, member 86 and the second pressure member 24 is thus mounted for vertical movement by motor 84.

The upper and lower hydraulic motors 84 and 64 are connected by suitable fluid circuits with sources of high hydraulic pressure. Simple forms of such circuits are shown in Fig. 10 with suitable valves of any conventional type for reversely delivering pressure to the opposite ends of the motors while discharging pressure from the other ends of the motor, for cutting off the supply of pressure to stop the motors in the retracted and pressure-applying positions of pressure members 24 and 20, 21 and 22, 23 to regulate the fluid pressures delivered to the motors and shown by pressure gauges to the proper amounts required by the pressure members. It will be understood that more complex circuits may be provided, with automatically controlled valves for stopping the motors in predetermined positions, also automatic controls in the electrical heater circuit to automatically energize the heating coil for a predetermined heating period and in timed relation with the operation of the pressure members, but these are not parts of the present invention.

In accordance with the pressures previously given by way of example, upper hydraulic motor 84 should be capable of exerting a working thrust on upper pressure member 24 of about 4200 lbs. to produce a pressure of around 900 lbs. per sq. in. on the margins of the sadiron assemblies S—P. Similarly, lower hydraulic motor 64 should be capable of delivering a working thrust on lower pressure member 20, 21 of about 12,000 lbs. to produce a pressure of around 600 lbs. per sq. in. on the main areas of the sadiron assemblies S—P.

The operation of the machine will be apparent in view of the earlier description of the method according to which the same works, but a brief summary will be given. A sadiron assembly S—P is first layered with the removable lower and upper mica pressure plates 20' and 22' (Fig. 4), and then installed in position on lower pressure plate 20 with riser block 61 down (Fig. 7). Rods 69 serve to insure proper seating for correct alinement with the heating coil and the upper pressure members. Fluid pressure is delivered to the lower end of lower hydraulic motor 64 to raise the lower pressure member through riser block 61 into operating position (Figs. 8 and 9). In such position the lower pressure member engages the under side of the assembly and coacts with the stationary upper pressure member 22, 23 to develop a clamping pressure of about 600 lbs. per sq. in. on the assembly so that the plates thereof are pressed into tight contact with the electric heating element between them. The high frequency heating coil 19 is energized to raise the temperature of the margins of the assembly to the previously stated range for the forming and brazing operation. As soon as the brazing solder has melted, fluid pressure is delivered to the upper side of upper hydraulic motor 84 to lower the whole upper movable pressure assembly, including pressure member 24 from its raised position (Fig. 7) to operating position (Figs. 8 and 9). Pressure member 24 is thus brought into operative engagement with the margins of the sadiron assembly S—P and coacts with the lower pressure member 20, 21 to exert a pressure of about 900 lbs. per sq. in. on such margins, thereby compressing the melted brazing solder and conforming the softened margins of the two plates to each other. Following this, the heating coil 19 is deenergized. The pressure members are maintained in engagement with the sadiron assembly during cooling at least down to the temperature at which the brazing solder hardens. Thereafter fluid pressure is relieved in the upper end of upper motor 84 and applied to the lower end thereof to raise upper pressure member 24 to its retracted position. Fluid pressure is likewise relieved from the lower end of lower motor 64 and applied to the upper end thereof to lower lower pressure member 20, 21 and the sadiron assembly to retracted position (Fig. 7). The completed sadiron assembly is now removed from the machine and another one installed for a new brazing operation.

In Fig. 12 is shown a modification of the upper and lower main pressure members. Instead of employing refractory lower pressure plate 20 in association with removable mica facing plate 20', a thick mica plate 120' may be provided permanently in the machine supported on a lower metal plate 121'. Similarly, the refractory upper pressure plate 22 with removable mica facing plate 22' may be replaced by an upper thick mica pressure member 122' for engagement with the upper side of the sadiron assembly. With such arrangement the second upper pressure member 124' engageable with the margins of the sadiron assembly will be constructed of metal in the same manner as member 24 previously described.

I claim:

1. The method of brazing a sadiron assembly of sole plate and pressure plate having opposing margins surrounding a recess in one of the plates containing a flat electric heating element to be compressed between the plates and brazing material between the margins which comprises applying clamping pressure to the assembly so as to clamp the plates against the heating element, subjecting the assembly to heating to melt the brazing material, independently applying local pressure to the margins of the plates to compress the melted brazing material and cooling the assembly while still under pressure below the hardening temperature of the brazing material.

2. The method of brazing a sadiron assembly of sole plate and pressure plate having opposing margins surrounding a recess in one of the plates containing a flat electric heating element to be clamped between the plates and brazing material between the margins which comprises applying clamping pressure to the assembly inwardly of the margins of the plates to clamp the plates against the heating element, subjecting the margins to heating to melt the brazing material, independently applying pressure locally to the margins of the plates to compress and form the margins and cooling the assembly while still under pressure below the hardening temperature of the brazing material.

3. The method of making an assembly comprising a sole plate, pressure plate and flat heating element for a sadiron, which method comprises providing a recess in one of said plates having a depth less than the thickness of the heating element, pressing said heating element in said recess between said two plates, heating the margins of said plates, independently applying local pressure to said margins so as to press said margins together while hot, and fastening said plates together at said margins.

4. The method of brazing a sadiron assembly of sole plate and pressure plate having opposing margins surrounding a recess in one of the plates containing a flat electric heating element to be compressed between the plates and brazing material between the margins which comprises applying clamping pressure within a range around 600 lbs. per sq. in. to the assembly inwardly of the margins of the plates to compress the plates against the heating element, subjecting the assembly to heating to a temperature within the range of 1100° to 1200° F. to melt the brazing material, applying pressure with a range around 900 lbs. per sq. in. locally to the margins of the plates to compress the brazing material and cooling the assembly while still under pressure below the hardening temperature of the brazing material.

5. The method of brazing a sadiron assembly of sole plate and pressure plate having opposing margins surrounding a recess in one of the plates containing a flat electric heating element to be compressed between the plates and brazing material between the margins which comprises subjecting the assembly to high frequency heating and melting the brazing material and during heating applying different high pressures to different areas of the plates, the lower pressure being applied inwardly of the plate margins to compress the plates against the heating element and the higher pressure being applied locally to the margins of the plate to compress them on the melted brazing material, and cooling the assembly while still subject to said applied pressures below the hardening temperature of the brazing material.

6. The method of brazing a sadiron assembly of sole plate and pressure plate having opposing margins surrounding a recess in one of the plates containing a flat electric heating element to be compressed between the plates and brazing material between the margins which comprises applying clamping pressure to the assembly from one side thereof to compress the plates against the heating element, subjecting the assembly to high frequency heating to melt the brazing material, applying from the opposite side of the assembly substantially higher pressure locally to the margins of the plates to compress the melted brazing material and cooling the assembly while still under pressure below the hardening temperature of the brazing material.

7. The method of brazing a sadiron assembly of sole plate and pressure plate having opposing margins surrounding a recess in one of the plates containing a flat electric heating element to be compressed between the plates and brazing material between the margins which comprises subjecting the assembly to high frequency heating until melting of the brazing material while maintaining the assembly under clamping pressure, applying local substantially higher pressure to the margins of the plates when the brazing material has melted to compress the margins on the brazing material and cooling the assembly while still under the applied pressures below the hardening temperature of the brazing material.

8. The method of brazing a sadiron assembly of sole plate and pressure plate having opposing margins surrounding a recess in one of the plates containing a flat electric heating element to be compressed between the plates and brazing material between the margins which comprises subjecting the assembly to high frequency heating to melt the brazing material while applying clamping pressure through mica surfaces to the plates, applying a higher pressure locally to margins of the plates to compress the brazing material and cooling the assembly while still under pressure below the hardening temperature of the brazing material.

9. The method of brazing a sadiron assembly of sole plate and pressure plate having opposing margins surrounding a recess in one of the plates containing a flat electric heating element to be compressed between the plates and brazing material between the margins which comprises supporting the plates of the assembly in supporting contact with mica pressure transmitting surfaces, subjecting the assembly to heating to melt the brazing material while applying clamping pressure to the plates to compress the plates tightly against the heating element, applying local higher pressure to the margins of the plates to compress the melted brazing material and cooling the assembly while still under pressure below the hardening temperature of the brazing material.

10. The method of brazing a sadiron assembly of sole plate and pressure plate having opposing margins surrounding a recess in one of the plates containing a flat electric heating element to be compressed between the plates and brazing material between the margins which comprises surrounding the plate margins with a high frequency heating coil, applying clamping pressure to the plates and subjecting the assembly to heating by the coil to melt the brazing material, applying local higher pressure to the margins of the assembly to compress the melted brazing material and cooling the assembly while still under pressure below the hardening temperature of the brazing material.

11. The method of brazing a sadiron assembly of sole plate and pressure plate having opposing margins surrounding a recess in one of the plates containing a flat electric heating element to be compressed between the plates and brazing material between the margins which comprises moving the assembly within a high frequency heating coil, applying clamping pressure to the plates to compress the plates against the heating element and heating the assembly by said coil to melt the brazing material, then applying local higher pressure to the margins of the plates to compress the brazing material, discontinuing heating of the coil, cooling the assembly while still subject to pressure below the hardening temperature of the brazing material and then removing the assembly from within the heating coil.

12. The method of brazing a sadiron assembly of sole plate and pressure plate having opposing margins surrounding a recess in one of the plates containing a flat electric heating element to be compressed between the plates and brazing material between the margins which comprises moving the assembly within a high frequency heating coil and applying clamping pressure to the assembly from one side thereof to clamp the plates tightly against the heating element, heating the assembly while clamped to melt the brazing material, applying local higher pressure to the margins of the plates to compress the melted brazing material, discontinuing heating of the coil and cooling the assembly while still subject to pressure below the hardening temperature of the brazing material, then removing the assembly from within the heating coil.

13. A machine for brazing a sadiron sole plate and pressure plate assembly comprising a heating means adapted to supply brazing heat to the margins of the plate assembly, opposing pressure members adapted to subject the plate assembly to clamping pressure and further pressure means for applying pressure locally to the margins of the plate assembly, pressure applying means for applying pressure to said opposing pressure members and independent pressure applying means for actuating said further pressure means.

14. A machine for brazing a sadiron sole plate and pressure plate assembly comprising a high frequency heating coil connected to a source of high frequency current and adapted to surround the margins of the plate assembly, opposing pressure members on opposite sides of the heating coil adapted to subject the plate assembly to pressure and a further independent pressure member on one side of the coil adapted to apply pressure to the margins of the plate assembly, pressure applying means for applying pressure to said opposing pressure members and independent pressure applying means for applying pressure to said independent pressure member.

15. A machine for brazing a sadiron sole plate and pressure plate assembly comprising a high frequency heating coil connected to a source of high frequency current and adapted to surround the margins of the plate assembly, a stationary first pressure member on one side of the coil adapted to engage one side of the plate assembly within the plate margins, an independent movable second pressure member on the same side of the coil adapted to engage the plate margin and a movable third pressure member on the other side of the coil coactive with the first and second pressure members.

16. A machine for brazing according to claim 15, further including pressure means for applying pressure to the plate assembly through the first and third pressure members and further pressure means for applying pressure to the margins of the plate assembly through the second and third pressure members.

17. A machine for brazing a sadiron sole plate and pressure plate assembly comprising a high frequency heating coil connected to a source of high frequency current and adapted to surround the margins of the plate assembly, a movably mounted pressure member on one side of the heating coil, a stationary pressure member mounted adjacent the other side of the heating coil and coactive with the movably mounted pressure member to apply pressure to the assembly within the margins of the assembly, a further movably mounted pressure member on one side of the coil adapted to apply pressure to the margins of the assembly and separate fluid pressure motors for actuating said movable pressure members.

18. A machine for brazing a sadiron sole plate and pressure plate assembly comprising a high frequency heating coil connected to a source of high frequency current and adapted to surround the margins of the plate assembly, a movably mounted pressure member on one side of the heating coil, a stationary pressure member mounted adjacent the other side of the heating coil and coactive with the movably mounted pressure member, a second movably mounted pressure member surrounding the stationary pressure member adapted to apply pressure to the margins of the assembly and separate fluid pressure motors for actuating the respective movable pressure members.

19. A machine for brazing a sadiron sole plate and pressure plate assembly comprising a high frequency heating coil connected to a source of high frequency current and adapted to surround the margins of the plate assembly, opposing pressure members of non-metallic, heat-resistant material on opposite sides of the heating coil adapted to subject a plate assembly to pressure and a further independent pressure member on one side of the coil and coactive with one of said first members adapted to apply pressure locally to the margins of a plate assembly.

20. A machine for brazing according to claim 19, wherein said opposing non-metallic pressure members comprise mica plates.

21. A machine for brazing a sadiron sole plate and pressure plate assembly comprising heating means adapted to supply brazing heat to the margins of the plate assembly and opposing pressure members having contact faces of mica on opposite sides of the heating means adapted to clamp the plate assembly for subjecting it to pressure.

22. A machine for brazing a sadiron sole plate and pressure plate assembly comprising a high frequency heating coil connected to a source of high frequency current and adapted to surround the margins of the plate assembly and opposing laminated pressure members of non-metallic, heat-resistant material adapted to subject a plate assembly to pressure, each comprising an inner section composed of a material selected from the class of lava and a mixture of Portland cement and asbestos and an outer section of mica.

23. A machine for brazing a sadiron sole plate and pressure plate assembly comprising a high frequency heating coil connected to a source of high frequency current and adapted to surround the margins of the plate assembly, a frame mounting the heating coil horizontally in the frame, a lower pressure member movably mounted by the frame below the coil adapted to elevate a plate assembly to heating position within the coil, a stationary upper pressure member mounted by the frame upwardly adjacent the upper side of the heating coil for coactive pressing action with the movable lower pressure member on a plate assembly, a second hollow upper pressure member movably mounted by the frame above the heating coil for coactive pressing action with the movable pressure member on the margins of a plate assembly and separate actuating means for the lower and upper pressure members.

24. A machine for brazing according to claim 23, wherein the actuating means comprise a hydraulic motor adapted to transmit pressure to the lower pressure member and a second hydraulic motor adapted to transmit a higher pressure to the upper moveable pressure member.

25. A machine for brazing according to claim 23, further including a moveable raiser plate supporting the lower pressure member, a stationary member on the frame and guide rods for the riser plate coactive with said stationary frame member.

26. A machine for brazing according to claim 23, further including seating means for locating a plate assembly in predetermined position on the lower pressure member.

27. A machine for brazing according to claim 23, further including a series of vertical rods adapted to seat a plate assembly in predetermined position on the lower pressure member when said pressure member is in lower position and a stationary frame-supported member mounting said guide rods in fixed position.

28. A machine according to claim 23 wherein the heating coil is shaped to the contour of a sadiron.

References Cited in the file of this patent

UNITED STATES PATENTS

| | | |
|---|---|---|
| 1,449,369 | Anderson | Mar. 27, 1923 |
| 1,612,317 | Reed | Dec. 28, 1926 |
| 1,764,271 | Leonard | June 17, 1930 |
| 2,320,013 | Scharf | May 25, 1943 |
| 2,432,491 | Thomas | Dec. 9, 1947 |
| 2,439,246 | Gibian | Apr. 6, 1948 |
| 2,480,364 | Hansen et al. | Aug. 30, 1949 |
| 2,493,950 | Dow et al. | Jan. 10, 1950 |
| 2,496,950 | Marcus et al. | Feb. 7, 1950 |
| 2,585,928 | Gomersall et al. | Feb. 19, 1952 |
| 2,627,010 | Matteson, Jr. et al. | Jan. 27, 1953 |